UNITED STATES PATENT OFFICE.

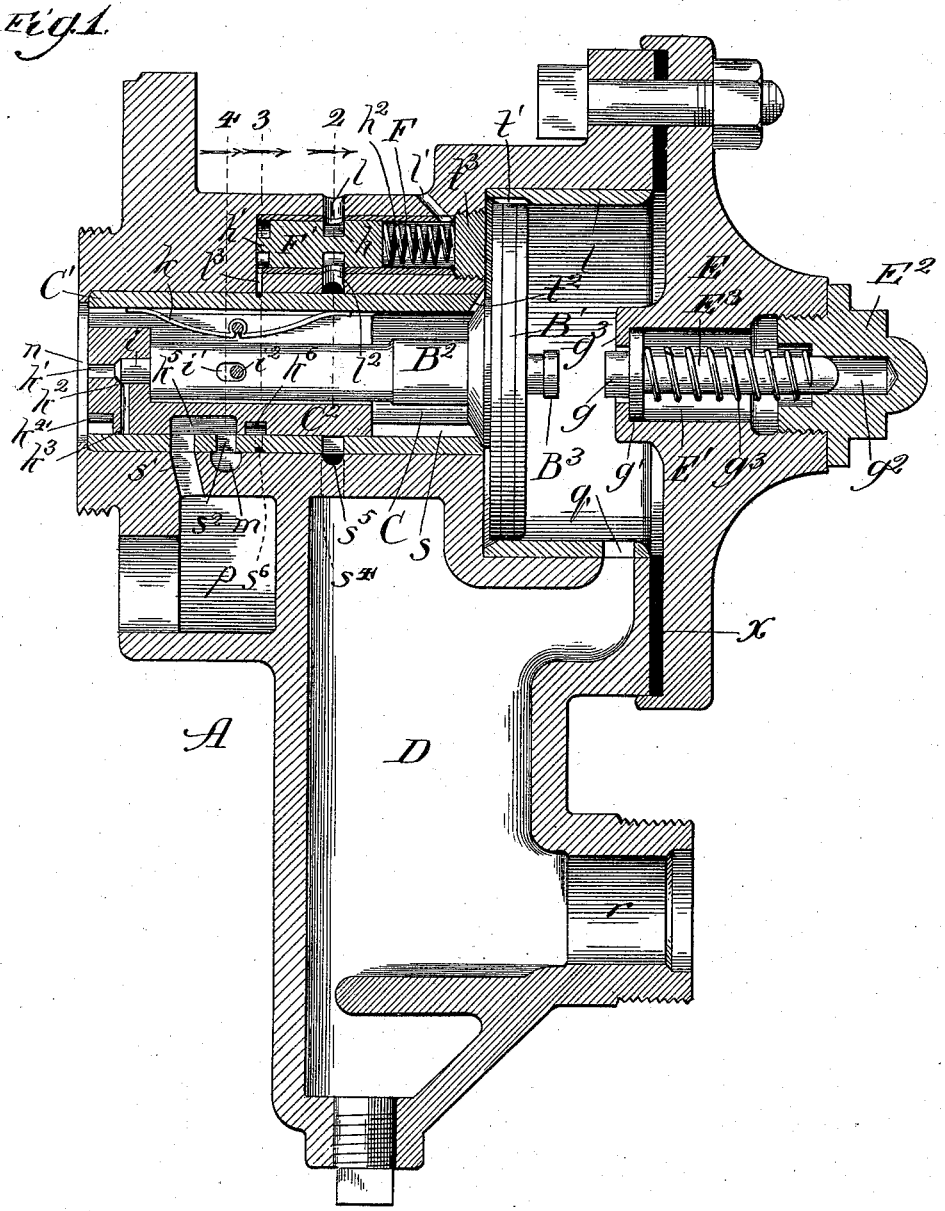

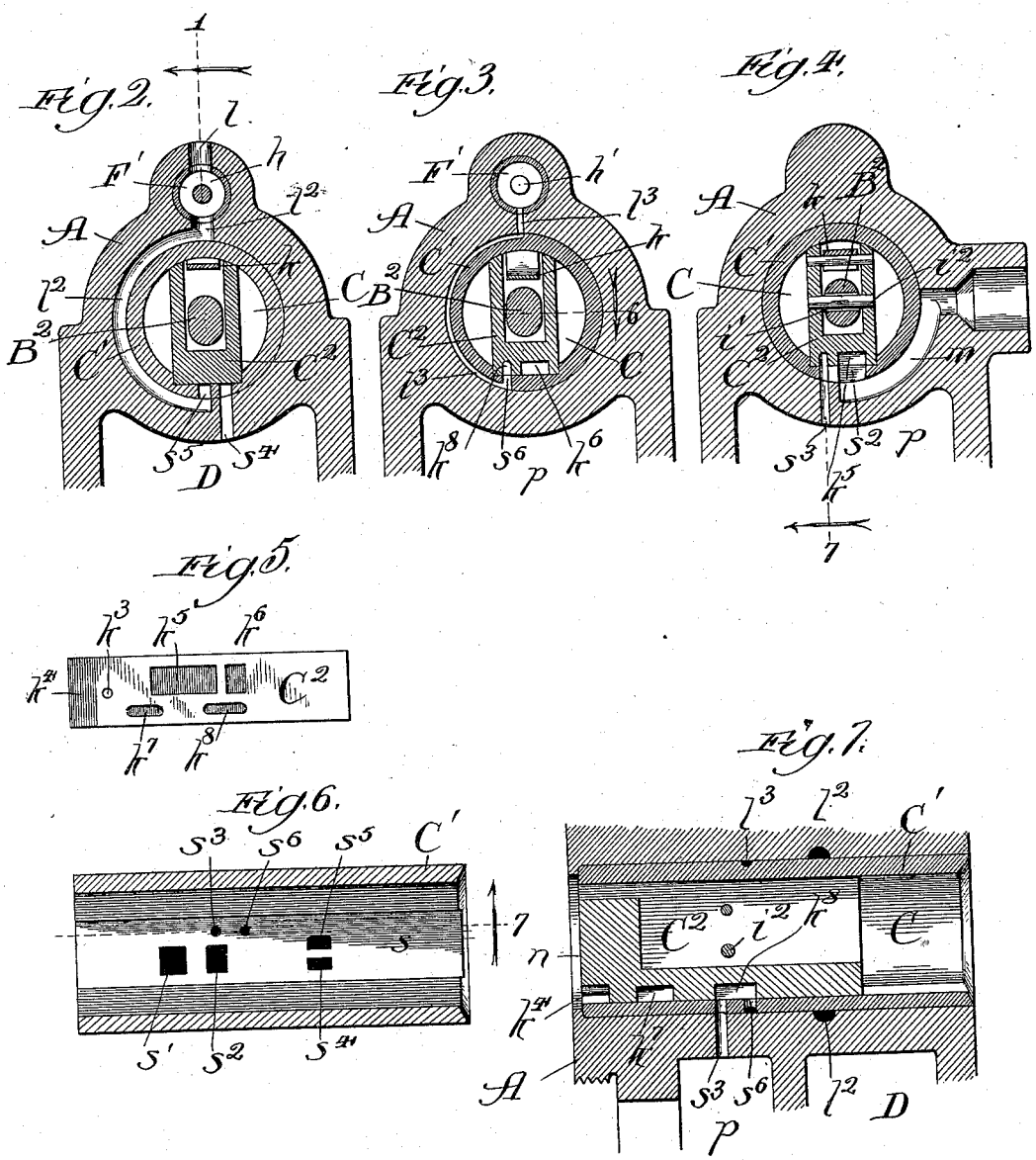

JAMES J. FINNEY, OF CHICAGO, ILLINOIS.

FLUID-PRESSURE AUTOMATIC BRAKE MECHANISM.

SPECIFICATION forming part of Letters Patent No. 547,484, dated October 8, 1895.

Application filed January 30, 1895. Serial No. 536,623. (No model.)

*To all whom it may concern:*

Be it known that I, JAMES J. FINNEY, a citizen of the United States, residing at Chicago, in the county of Cook and State of Illinois, have invented a new and useful Improvement in Fluid-Pressure Automatic Brake Mechanism, of which the following is a specification.

My invention relates to improvements in the appliances hitherto employed as a feature of or in connection with "triple valves" for bringing about a quick-action emergency operation under abnormal reduction of train-pipe pressure in the air-brake systems of railway-trains. Hitherto it has been the practice in bringing about the quick-action emergency stop to cause pressure to vent from the train-pipe to the brake-cylinder to a limited extent and in advance of the flow of pressure from the auxiliary reservoir to the brake-cylinder, the train-pipe venting thus effected operating to quicken the action of the triple valves on succeeding cars of the train. While an emergency action is quickened to a very material extent by the flow of pressure from the train-pipe to the brake-cylinder in the constructions hitherto employed, this quick action is due to the lowering of the train-pipe pressure and not to any material extent, at least, to the fact that the pressure thus vented flows to the brake-cylinder. It has been claimed by competent experts that the extra flow of pressure to the brake-cylinder from the train-pipe is a detriment rather than an advantage, for the reason that the pressure of the auxiliary reservoir when expanded into the brake-cylinder on top of or in addition to that which has previously entered from the train-pipe produces injurious strain upon the lever mechanism, besides skidding the wheels. In practice the auxiliary reservoir is usually of sufficient capacity with relation to the brake-cylinder to cause the reservoir-pressure under full service or emergency action to bring about the maximum pressure of the brake-shoes against the car-wheels which the brake mechanism is designed to stand or to exert without skidding the wheels, and as when the comparatively large emergency port or passage between the auxiliary reservoir and brake-cylinder is opened equalization of pressure between the two is brought about almost instantaneously the pressure vented from the train-pipe to the brake-cylinder does not materially hasten the movement of the brake-shoes.

My object is to provide an improved appliance for use in connection with and preferably incorporated in the structure of a triple valve, which will operate under the movement of the triple-valve abutment or piston when abnormal reduction of train-pipe pressure is brought about to open and then close communication between the train-pipe and outside air to vent a limited extent of pressure from the train-pipe and thus produce the quick-action emergency operation without danger of straining the brake mechanism.

In the drawings, wherein I show my appliance as forming a part of a triple-valve structure, Figure 1 is a central vertical section of a triple valve provided with my improvements; Figs. 2, 3, and 4, broken sections, taken, respectively, on lines 2, 3, and 4 of Fig. 1, and viewed in the direction of the arrows; Fig. 5, a bottom plan view of the main slide-valve of the triple-valve device; Fig. 6, a plan sectional view of a bushing, the section being taken on line 6 of Fig. 3 and showing the seat upon which the valve shown in Fig. 5 slides; and Fig. 7, a broken section taken on line 7 of of Figs. 4 and 6 and viewed as indicated by the arrows.

A is the main shell or body portion of a triple valve containing a piston-chamber B, having a bushing $t$, a main valve-chamber C, fitted with a bushing $C'$, and a drip-chamber D. The chamber B is closed by means of a cap-plate E, which is bolted to the main body portion against an intervening gasket $x$. The drip-chamber D in practice communicates at $r$ with the main train-pipe or brake-pipe of the brake system, and has a port $q$ opening into the piston-chamber B adjacent to the cap-plate E.

In the shell A is a chamber or passage $p$, which communicates with the brake-cylinder, and a port $n$, which communicates with the auxiliary reservoir. The lower inner side of the bushing $C'$ forms a valve-seat $s$, having a comparatively-large port $s'$ leading to the brake-cylinder passage $p$, a port $s^2$ leading to an exhaust-passage $m$, which goes to the outside air, a port $s^3$ of comparatively small dimensions leading to the brake-passage $p$, and a comparatively-large quick-action inlet-port $s^4$ leading to the drip-chamber D.

In the shell A, preferably, though not necessarily, in the position shown, is a valve-chamber F, provided with an exhaust-port $l$ and a vent-passage $l'$. In the valve-seat $s$ is a quick-action outlet-port $s^5$, which communicates with a passage $l^2$, preferably cored or cut in the shell about the bushing C' and leading to the chamber F in line with the exhaust-port $l$; also, in the valve-seat $s$ is a small port $s^6$, communicating with a passage $l^3$, preferably provided in the outer surface of the bushing C' and extending to the chamber F at the end of the latter opposite the vent-opening $l'$.

$C^2$ is the main slide-valve, which may carry the usual spring $k$. In the end of the slide-valve is a passage $k'$, terminating in a valve-seat $k^2$, beyond which is the service-passage $k^3$, extending through to the working face of the valve. The end of the slide-valve at its under side is cut away, as indicated, to form an emergency-passage $k^4$. In the under face of the main slide-valve are grooves or recesses $k^5$, $k^6$, $k^7$, and $k^8$, all preferably of the relative sizes and in the relative positions shown in Fig. 5.

In the chamber B is a piston B', having a stem $B^2$, which passes through the main slide-valve, and at its end carries or is shaped into a graduating valve $i$, which closes against the valve-seat $k^2$. Extending transversely through the stem $B^2$ is an elongated slot $i'$, which receives a pin $i^2$, fastened at its opposite ends in the sides of the main slide-valve. In the bushing $t$ is a feed-groove $t'$, and, in the position shown at the bushing C', is a feed-groove $t^2$. In the chamber F is a valve F', which is preferably a piston slide-valve, provided with a central circumferential recess $h$, which when the valve is in the normal position shown registers with and opens communication between the ports $l^2\ l$. At its end adjacent to the passage $l^3$ the valve carries a stop projection $h'$, which prevents the valve from seating, over its entire end area, against the end of the chamber F. Confined between the valve F' and a screw-plug $t^3$ is a spring $h^2$, which tends to force the valve F' to the normal position shown. In the cap-plate E is a chamber E', closed by means of a screw-plug $E^2$. The chamber E' opens into the chamber B and contains a buffer $E^3$, comprising a stem $g$, provided with a collar $g'$, and working in a guide-recess $g^2$ in the screw-plug $E^2$, and a spring $g^3$, confined between the screw-plug $E^2$ and the collar $g'$, and operating normally to press the latter against a stop $g^3$ afforded by an inward-projecting flange on the cap-plate E. On the piston B' is a stop or buffer projection $B^3$.

My improved valve device is made to conform to standard requirements in that it is made to register with the standard fittings provided for triple valves at the auxiliary reservoir, brake-cylinder, and train-pipe. The figures show the main slide-valve at release position, whereby air entering at $r$ from the train-pipe fills the drip-chamber and chamber B and passes through the grooves $t'\ t^2$ to the chamber C and thence through the port $n$ to the auxiliary reservoir, charging the latter to equalize its pressure with that of the train-pipe. The slide-valve groove $k^5$ registers with the ports $s'\ s^2$, whereby any pressure in the brake-cylinder is vented through the passage $m$ to the outside air. The groove $k^8$ registers with the ports $s^3\ s^6$, whereby the chamber F is open through the passage $l^3$, ports $s^6\ s^3$, chamber or passage $p$, and ports $s'\ s^2$ and passage $m$ to the outside air. The absence of air under pressure in the chamber F causes the spring $h^2$ to hold the valve F' in normal position, whereby the passage $l^2$ is open through the port $l$ to the outside air. Under a reduction of train-pipe pressure for a service-stop the piston B is moved by the preponderance of reservoir-pressure until the projection $B^3$ strikes the buffer $E^3$. In moving from release to service-stop position the stem $B^2$ advances until the end of the groove $i'$ engages the pin $i^2$ to unseat the valve $i$, and then the main slide-valve is moved by the engagement of the stem $B^2$ with the pin $i^2$ to advance the service-stop passage $k^3$ to the port $s'$. When the slide-valve is in this position, all the other ports in the valve-seat are closed, whereby pressure flows from the auxiliary reservoir through the passages $k'\ k^3\ s'\ p$ to the brake-cylinder. When pressure in the auxiliary reservoir, through its venting to the brake-cylinder, falls slightly below that in the train-pipe, the piston B' is moved to seat the graduating valve $i$ and close the passage $k^3$ in the usual manner. A rise of train-pipe pressure to release brakes will move the valve mechanism back to the position shown, whereby the brake-cylinder is vented.

Under abnormal reduction of pressure for an emergency stop the piston B' is forced the full limit of its traverse under the auxiliary-reservoir pressure to compress the buffer $E^3$ and bear against the cap-plate E. This causes the slide-valve to be moved to the position wherein the recess $k^6$ registers with the ports $s^4\ s^5$, causing air from the drip-chamber D and the train-pipe to flow through the ports $s^4\ s^5$, passage $l^2$, and port $l$ to the outside air. It also causes the groove $k^7$ to register with the ports $s^3\ s^6$ and the emergency-passage $k^4$ to register with the port $s'$. Owing to the large size of the passage $k^4$, full reservoir-pressure expands almost instantly into the brake-cylinder to set the brakes with full force. As pressure from the auxiliary reservoir enters the passage $p$, it also flows through the port $s^3$, groove $k^7$, port $s^6$, and passage $l^3$ to the chamber F, and by overcoming the resistance of the spring $h^2$ slides the valve F' in the direction of the screw-plug $t^3$ to close communication between the passage $l^2$ and the exhaust-port $l$. In practice the quick-action passage between the train-pipe and outside air (through the port $s^4$, valve-recess $k^6$, port $s^5$, passage $l^2$, recess $h$ of the valve F', and port $l$) should be large enough to cause the desired extent of pressure to vent from the train-pipe before the quick-action passage is closed by the valve F' under the action of the reservoir or brake-cylinder pressure flowing through the passage $l^3$. The valve F' will remain closed until train-pipe pressure is again raised sufficiently to move the main slide-valve to release position, when the pressure in the chamber F, which holds the valve F' closed, will vent through the passage $l^3$, port $s^6$, slide-valve groove $k^8$, and port $s^3$ to the chamber $p$, and pass out at $m$ with the brake-pipe pressure. By providing the passages, of proper sizes, with relation to each other and to the tension of the spring $h^2$ the quick-action emergency operation may be produced, to all intents and purposes, with the same speed and effect as with the quick-action appliances hitherto in general use.

The gist of my invention lies, broadly stated, in providing a normally-closed vent-passage between the train-pipe and outside air at or adjacent to a triple-valve, main-valve mechanism movable only under emergency reductions of train-pipe pressure to open said passage, and supplemental valve mechanism governed by and following the action of the main-valve mechanism to again close said passage, and although the mechanism shown and described is that which I prefer to employ my invention may be carried out with mechanism variously modified. I do not therefore confine my improvements to the details shown and described, because they may, obviously, be modified without departing from the spirit of my invention as defined by the claims.

What I claim as new, and desire to secure by Letters Patent, is—

1. In the triple valve device of a fluid pressure automatic brake mechanism, the combination of a chamber or casing having direct connections to a brake-pipe and to the outside air, respectively, main slide-valve of the triple-valve device, normally closing the communication between said connections and movable only under the emergency reduction of brake-pipe pressure to open said communication, and supplemental valve-mechanism governed by and following the action of the main slide valve to close said communication, substantially as and for the purpose set forth.

2. In the triple-valve device of a fluid-pressure brake-mechanism, the combination with the main slide-valve and its seat, of a quick action emergency inlet-port in the seat communicating directly with the brake-pipe, a quick action emergency outlet port normally open through a passage to the outside air, the said main slide-valve normally closing communication between said ports and movable only under the emergency reduction of brake-pipe pressure to open communication between said ports, and supplemental valve-mechanism governed by and following the said action of the main slide-valve to close said passage, substantially as and for the purpose set forth.

3. In a fluid pressure automatic brake-mechanism, the combination of a brake-pipe, a brake-cylinder, an auxiliary-reservoir, and a triple-valve device having main-valve mechanism whose preliminary traverse under service reduction of brake-pipe pressure admits air from the auxiliary-reservoir to the brake-cylinder, and which by a further traverse under emergency reduction of brake-pipe pressure vents air directly from the brake-pipe to the outside air, and having supplemental valve-mechanism governed by, and following the emergency action of, the main-valve mechanism to close communication between the brake-pipe and outside air, substantially as and for the purpose set forth.

4. In the triple-valve device of a fluid pressure brake-mechanism, the combination with the main slide-valve mechanism and its seat, of a quick action passage between the brake-pipe and outside-air, normally closed by the main slide-valve, a chamber in said passage, ports in said seat governed by the main slide-valve and communicating respectively with the brake-cylinder passage and with the said chamber, a normally open supplemental valve in said chamber movable under pressure from the brake-cylinder passage to close the said quick action passage, the main slide valve operating only under an emergency reduction of brake-pipe pressure to move and open the quick action passage and then establish communication between the said ports whereby pressure from the brake-cylinder passage flows to the said chamber and closes the said supplemental valve, substantially as described.

5. In the triple-valve device of a fluid pressuse brake mechanism, the combination with the main slide-valve mechanism and its seat, of a quick action passage between the brake-pipe and outside-air normally closed by the main slide-valve, a valve chamber interposed in said passage, ports in said seat governed by the main slide-valve and communicating respectively with the brake cylinder passage and with the said valve-chamber, a supplemental slide-valve in said valve-chamber normally maintaining the said quick action passage open through said chamber and movable to close the passage under pressure from the brake-cylinder passage, the main slide-valve operating only under an emergency reduction of train-pipe pressure, to move and open the quick action passage and then establish communication between the said ports, whereby pressure from the brake-cylinder passage flows to the said chamber and moves the said supplemental slide-valve to close the quick action passage, substantially as described.

6. In the triple-valve device of a fluid pressure brake-mechanism, the combination with the main slide-valve mechanism and its seat, of a normally closed quick action passage between the brake-pipe and outside-air, opened only by movement of said valve under an emergency reduction of brake-pipe pressure, a chamber in said passage, ports, in said seat, governed by the main slide-valve and communicating respectively with the brake-cylinder passage and with the said chamber, a normally open supplemental valve in said chamber movable, under pressure entering the chamber from the brake cylinder passage, to close the said quick action passage, the main slide-valve operating when at release and emergency positions only to establish communication between said ports, substantially as and for the purpose set forth.

JAMES J. FINNEY.

In presence of—
M. J. FROST,
J. N. HANSON.